(12) United States Patent
Chen et al.

(10) Patent No.: US 10,057,364 B2
(45) Date of Patent: Aug. 21, 2018

(54) METHOD AND APPARATUS FOR REMOTELY RUNNING APPLICATION PROGRAM

(71) Applicant: Huawei Technologies Co., Ltd., Shenzhen (CN)

(72) Inventors: Pu Chen, Shenzhen (CN); Kaizhi Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 14/961,270

(22) Filed: Dec. 7, 2015

(65) Prior Publication Data

US 2016/0088109 A1    Mar. 24, 2016

Related U.S. Application Data

(63) Continuation of application No. PCT/CN2014/084492, filed on Aug. 15, 2014.

(30) Foreign Application Priority Data

Oct. 30, 2013  (CN) .......................... 2013 1 0530387

(51) Int. Cl.
*G06F 15/16* (2006.01)
*H04L 29/08* (2006.01)
(Continued)

(52) U.S. Cl.
CPC ........ *H04L 67/2804* (2013.01); *G06F 9/4843* (2013.01); *H04L 67/10* (2013.01);
(Continued)

(58) Field of Classification Search
USPC ....... 709/203, 206, 217, 219, 223, 224, 226, 709/228, 230, 231, 232, 238; 704/9, 231;
(Continued)

(56) References Cited

U.S. PATENT DOCUMENTS

2006/0111909 A1   5/2006  Maes et al.
2007/0276651 A1*  11/2007  Bliss .................... G10L 15/30
                                                      704/9

(Continued)

FOREIGN PATENT DOCUMENTS

CN          1323435 A      11/2001
CN          1848774 A      10/2006
(Continued)

OTHER PUBLICATIONS

Foreign Communication From a Counterpart Application, European Application No. 14858791.8, Extended European Search Report dated Jun. 23, 2016, 4 pages.
(Continued)

*Primary Examiner* — Quang N Nguyen
(74) *Attorney, Agent, or Firm* — Conley Rose, P.C.

(57) ABSTRACT

A method for remotely running an application program. A client acquires an application program from a server, runs the application program on the client, and detects whether the application program triggers an application programming interface (API) invocation request. If the application program triggers the API invocation request, the client determines that the client or the server executes API invocation according to a preset invocation policy. A device resource of the client can be used to execute a part of the API invocation, which enhances efficiency in remote running of the application program and improves user experience. In addition, the latest data obtained according to a result of application program running can be saved onto the server, which ensures data access security.

12 Claims, 8 Drawing Sheets

(51) Int. Cl.
*G06F 9/48* (2006.01)
*H04L 29/06* (2006.01)
*G06F 9/54* (2006.01)

(52) U.S. Cl.
CPC .............. *H04L 67/16* (2013.01); *H04L 67/42* (2013.01); *G06F 9/547* (2013.01)

(58) Field of Classification Search
USPC .................. 726/14, 29; 717/172; 379/265.09
See application file for complete search history.

(56) References Cited

U.S. PATENT DOCUMENTS

| | | | |
|---|---|---|---|
| 2009/0235349 A1* | 9/2009 | Lai | H04L 9/3213 |
| | | | 726/14 |
| 2010/0064299 A1 | 3/2010 | Kacin et al. | |
| 2012/0226742 A1 | 9/2012 | Momchilov et al. | |
| 2013/0006620 A1* | 1/2013 | Maes | H04L 29/06027 |
| | | | 704/231 |
| 2013/0185810 A1* | 7/2013 | Suchter | G06F 21/6209 |
| | | | 726/29 |
| 2013/0236000 A1* | 9/2013 | Qiu | G06F 9/54 |
| | | | 379/265.09 |
| 2014/0109078 A1* | 4/2014 | Lang | G06F 8/52 |
| | | | 717/172 |
| 2014/0372503 A1 | 12/2014 | Wang | |
| 2015/0334184 A1* | 11/2015 | Liverance | G06F 9/547 |
| | | | 709/203 |

FOREIGN PATENT DOCUMENTS

| | | |
|---|---|---|
| CN | 101534196 A | 9/2009 |
| CN | 102662741 A | 9/2012 |
| CN | 103023906 A | 4/2013 |

OTHER PUBLICATIONS

Foreign Communication From a Counterpart Application, PCT Application No. PCT/CN2014/084492, English Translation of International Search Report dated Nov. 18, 2014, 2 pages.

Foreign Communication From a Counterpart Application, PCT Application No. PCT/CN2014/084492, Written Opinion dated Nov. 18, 2014, 6 pages.

Machine Translation and Abstract of Chinese Publication No. CN1848774, Oct. 18, 2006, 10 pages.

Fleisch, B., et al., "Distributed System V IPC in Locus: A Design and Implementation Retrospective," XP58204099, 1986, pp. 386-396.

Foreign Communication From a Counterpart Application, Chinese Application No. 201310530387.7, Chinese Office Action dated Apr. 28, 2017, 10 pages.

Foreign Communication From a Counterpart Application, European Application No. 14858791.8, European Office Action dated Jun. 12, 2017, 8 pages.

* cited by examiner

METHOD AND APPARATUS FOR REMOTELY RUNNING APPLICATION PROGRAM

CROSS-REFERENCE TO RELATED APPLICATIONS

This application is a continuation of International Application No. PCT/CN2014/084492, filed on Aug. 15, 2014, which claims priority to Chinese Patent Application No. 201310530387.7, filed on Oct. 30, 2013, both of which are hereby incorporated by reference in their entireties.

TECHNICAL FIELD

The present disclosure relates to the field of computer technologies, and in particular, to a method and an apparatus for remotely running an application program.

BACKGROUND

A remote desktop (also known as a virtual desktop), such as Citrix application virtualization and Microsoft Application Virtualization (APP-V), is commonly used to implement remote running of an application program. In a virtual desktop scenario, there is at least one server and one client. A user remotely logs in, from the client via a communications network such as an Internet Protocol (IP) network, to a remote device such as the server by using client software of a remote login application program such as a remote login application program (mstsc.exe) on a Windows system. This manner enables content displayed on a screen of the client to be transmitted to a screen of the server for display, and may further support voice transmission, mapping of pluggable hardware, or the like between the client and the server. In addition, after remote running is ended, latest data obtained according to a remote running result of an application program can be saved onto the server.

Generally, a diskless workstation can be used to implement remote desktop-based remote running of an application program. Instead of mounting a hard disk to a client, a preboot execution environment (PXE) technology is used to map a disk image file on a server to the client, and to generate a virtual hard disk and mount it to the client. The user can run an operating system and various application programs on the virtual hard disk, and access hardware resources on the server and read and write data on the server by using a network.

In addition, a Remote Procedure Call Protocol (RPC) technology can also be used to implement the remote desktop-based remote running of an application program. After an application program and data required for running the application program are installed on the client, the client directly requests a service from an application program on a remote device by means of remote interface invocation, without a need to know a protocol of an underlying network technology. However, this manner requires that an application program on the client and the server adapt to a network protocol on a software code level. Therefore, not all existing application programs can smoothly support remote startup and running, resulting in poor compatibility.

In conclusion, all the methods for remotely running an application program based on the remote desktop technology need to transmit data between a client and a server during remote running of the application program. For some graphics processing or numerical calculation application programs that involve complex execution, such as high-definition graphics drawing and games, a larger amount of data needs to be transmitted, which not only occupies higher network bandwidth and reduces running efficiency in remote running of the application programs, but also may incur distortion during data transmission and compression, and encoding and decoding. Consequently, remotely running an application program cannot achieve effects the same as those achieved when the application program is run locally on the server, leading to poor user experience. In addition, the foregoing remote running of an application program that is implemented based on the remote desktop technology involves a more complex network deployment manner and a more complex technology implementation process.

SUMMARY

Technical Problem

In view of this, the technical problem to be resolved by the present disclosure is how to make remote running of an application program achieve effects the same as those achieved when the application program is run locally on a server.

Solution

To resolve the foregoing technical problem, according to a first aspect, the present disclosure provides a method for remotely running an application program, including acquiring, by a client, an application program from a server and running the application program on the client; detecting, by the client, whether the application program triggers an application programming interface (API) invocation request; and if the application program triggers the API invocation request, determining, by the client according to a preset invocation policy, that the client or the server executes API invocation.

With reference to the first aspect, in a first possible implementation manner, the acquiring, by a client, an application program from a server and running the application program on the client includes sending, by the client to the server, an acquisition request for a target program of the application program, where the acquisition request is used to instruct the server to return the target program of the application program; receiving, by the client, the target program from the server; and executing, by the client, the target program, so as to run the application program on the client.

With reference to the first aspect, in a second possible implementation manner, the determining, by the client according to a preset invocation policy, that the client or the server executes API invocation includes determining, by the client, whether the API invocation needs to be executed using a device resource of the client; and if the API invocation needs to be executed using the device resource of the client, determining that the client executes the API invocation; or if the API invocation does not need to be executed using the device resource of the client, determining that the server executes the API invocation.

With reference to the second possible implementation manner of the first aspect, in a third possible implementation manner, the invocation policy includes, if the API invocation is to request to write data into a registry of the server, or request to save, onto the server, data obtained after running of the application program is ended, or request to access a network using a network resource of the server, determining that the API invocation does not need to be executed using the device resource of the client.

With reference to the second possible implementation manner of the first aspect, in a fourth possible implementation manner, after the determining that the client executes the API invocation, the method includes generating, by the client, a local API invocation request according to the API invocation request; invoking, by the client, the device resource of the client and executing local API invocation according to the local API invocation request, so as to generate an execution result of the local API invocation; and sending, by the client, the execution result of the local API invocation to the application program.

With reference to the second possible implementation manner of the first aspect, in a fifth possible implementation manner, after the determining that the server executes the API invocation, the method includes generating, by the client, a remote API invocation request according to the API invocation request; sending, by the client, the remote API invocation request to the server, where the remote API invocation request is used to instruct the server to execute remote API invocation and return an execution result of the remote API invocation; receiving, by the client from the server, the execution result of the remote API invocation; and sending, by the client, the execution result of the remote API invocation to the application program.

With reference to the fifth possible implementation manner of the first aspect, in a sixth possible implementation manner, the sending, by the client, the remote API invocation request to the server includes serializing, by the client, the remote API invocation request, so as to generate request data of the remote API invocation, where the request data carries information about a serialized remote API invocation request; encrypting, by the client, the request data; and sending, by the client, the encrypted request data to the server.

With reference to the fifth possible implementation manner of the first aspect, in a seventh possible implementation manner, the receiving, by the client from the server, the execution result of the remote API invocation includes receiving, by the client from the server, response data of the API invocation, where the response data carries information about a serialized execution result of the remote API invocation; if the response data is encrypted, decrypting, by the client, the response data; and deserializing, by the client, the response data that is decrypted, so as to obtain the execution result of the remote API invocation.

With reference to the foregoing possible implementation manners of the first aspect, in an eighth possible implementation manner, a manner in which the client detects whether the application program triggers the API invocation request includes any one of a HOOK manner, a filter driver manner, and a manner of replacing an interrupt table of a system.

To resolve the foregoing technical problem, according to a second aspect, the present disclosure provides a method for remotely running an application program, including receiving, by a server, a remote API invocation request from a client, where the remote API invocation request carries information about requesting, by the client, the server to execute API invocation; invoking, by the server, a device resource of the server and executing remote API invocation according to the remote API invocation request, so as to generate an execution result of the remote API invocation; and sending, by the server, the execution result of the remote API invocation to the client.

With reference to the second aspect, in a first possible implementation manner, before the receiving, by a server, a remote API invocation request from a client, the method includes receiving, by the server from the client, an acquisition request for a target program of an application program, where the acquisition request carries information about requesting the server to return the target program of the application program; and sending, by the server according to the acquisition request, the target program of the application program to the client.

With reference to the second aspect, in a second possible implementation manner, the receiving, by a server, a remote API invocation request from a client includes receiving, by the server from the client, request data of the remote API invocation, where the request data carries information about a serialized remote API invocation request; if the request data is encrypted, decrypting, by the server, the request data; and deserializing, by the server, the request data that is decrypted, so as to obtain the remote API invocation request.

With reference to the second possible implementation manner of the second aspect, in a third possible implementation manner, the sending, by the server, the execution result to the client includes serializing, by the server, the execution result of the remote API invocation, so as to generate response data of the remote API invocation, where the response data carries information about a serialized execution result of the remote API invocation; encrypting, by the server, the response data; and sending, by the server, the encrypted response data to the client.

To resolve the foregoing technical problem, according to a third aspect, the present disclosure provides an apparatus for remotely running an application program, including a running unit configured to acquire an application program from a server and run the application program on a client; a detection unit connected to the running unit and configured to detect whether the application program triggers an API invocation request; and a processing unit connected to the detection unit and configured to, if the application program triggers the API invocation request, determine, according to a preset invocation policy, that the client or the server executes API invocation.

With reference to the third aspect, in a first possible implementation manner, the running unit includes an acquiring module and a running module. The acquiring module is configured to send an acquisition request for a target program of the application program to the server, where the acquisition request is used to instruct the server to return the target program of the application program; the acquiring module is further configured to receive the target program from the server; and the running module is connected to the acquiring module and is configured to execute the target program, so as to run the application program on the client.

With reference to the third aspect, in a second possible implementation manner, the processing unit includes a determining module, and the determining module is connected to the detection unit and is configured to determine whether the API invocation needs to be executed using a device resource of the client; and if the API invocation needs to be executed using the device resource of the client, determine that the client executes the API invocation; or if the API invocation does not need to be executed using the device resource of the client, determine that the server executes the API invocation.

With reference to the second possible implementation manner of the third aspect, in a third possible implementation manner, the invocation policy includes, if the API invocation is to request to write data into a registry of the server, or request to save, onto the server, data obtained after running of the application program is ended, or request to access a network using a network resource of the server, determining that the API invocation does not need to be executed using the device resource of the client.

With reference to the second possible implementation manner of the third aspect, in a fourth possible implementation manner, the processing unit further includes a local execution module, where the local execution module is connected to the determining module and after it is determined that the client executes the API invocation, is configured to generate a local API invocation request according to the API invocation request; invoke the device resource of the client and execute local API invocation according to the local API invocation request, so as to generate an execution result of the local API invocation; and send the execution result of the local API invocation to the application program.

With reference to the second possible implementation manner of the third aspect, in a fifth possible implementation manner, the processing unit further includes a remote execution module, where the remote execution module is connected to the determining module and after it is determined that the server executes the API invocation, is configured to generate a remote API invocation request according to the API invocation request; send the remote API invocation request to the server, where the remote API invocation request is used to instruct the server to execute remote API invocation and return an execution result of the remote API invocation; receive, from the server, the execution result of the remote API invocation; and send the execution result of the remote API invocation to the application program.

With reference to the fifth possible implementation manner of the third aspect, in a sixth possible implementation manner, the remote execution module is further configured to serialize the remote API invocation request, so as to generate request data of the remote API invocation, where the request data carries information about a serialized remote API invocation request; encrypt the request data; and send the encrypted request data to the server.

With reference to the fifth possible implementation manner of the third aspect, in a seventh possible implementation manner, the remote execution module is further configured to receive response data of the API invocation from the server, where the response data carries information about a serialized execution result of the remote API invocation; if the response data is encrypted, decrypt the response data; and deserialize the response data that is decrypted, so as to obtain the execution result of the remote API invocation.

With reference to the foregoing possible implementation manners of the third aspect, in an eighth possible implementation manner, a manner in which the detection unit detects whether the application program triggers the API invocation request includes any one of a HOOK manner, a filter driver manner, and a manner of replacing an interrupt table of a system.

To resolve the foregoing technical problem, according to a fourth aspect, the present disclosure provides an apparatus for remotely running an application program, including a receiving unit configured to receive a remote API invocation request from a client, where the remote API invocation request carries information about requesting, by the client, a server to execute API invocation; an execution unit connected to the receiving unit and configured to invoke a device resource of the server and execute remote API invocation according to the remote API invocation request, so as to generate an execution result of the remote API invocation; and a sending unit connected to the receiving unit and the execution unit and configured to send the execution result of the remote API invocation to the client.

With reference to the fourth aspect, in a first possible implementation manner, the receiving unit is further configured to receive, from the client, an acquisition request for a target program of an application program, where the acquisition request carries information about requesting the server to return the target program of the application program; and the sending unit is further configured to send the target program of the application program to the client according to the acquisition request.

With reference to the fourth aspect, in a second possible implementation manner, the receiving unit is further configured to receive, from the client, request data of the remote API invocation, where the request data carries information about a serialized remote API invocation request; if the request data is encrypted, decrypt the request data; and deserialize the request data that is decrypted, so as to obtain the remote API invocation request.

With reference to the second possible implementation manner of the fourth aspect, in a third possible implementation manner, the sending unit is further configured to serialize the execution result of the remote API invocation, so as to generate response data of the remote API invocation, where the response data carries information about a serialized execution result of the remote API invocation; encrypt the response data; and send encrypted response data to the client.

Beneficial Effect

According to a type of API invocation during running of an application program, a client or a server is used to execute the API invocation. According to the method and apparatus for remotely running an application program in the present disclosure, a device resource of the client can be used to execute a part of the API invocation, which enhances efficiency in remote running of the application program and improves user experience. In addition, latest data obtained according to a result of application program running can be saved onto the server, which ensures data access security. Therefore, remote running of the application program achieves effects the same as those achieved when the application program is run locally on the server.

Other features and aspects of the present disclosure become apparent from detailed descriptions of exemplary embodiments set forth below when taken in conjunction with accompanying drawings.

BRIEF DESCRIPTION OF DRAWINGS

Accompanying drawings that are included in this specification and constitute a part of the specification illustrate, together with the specification, exemplary embodiments, features, and aspects of the present disclosure, and are used to explain principles of the present disclosure.

DESCRIPTION OF EMBODIMENTS

Figure 1:
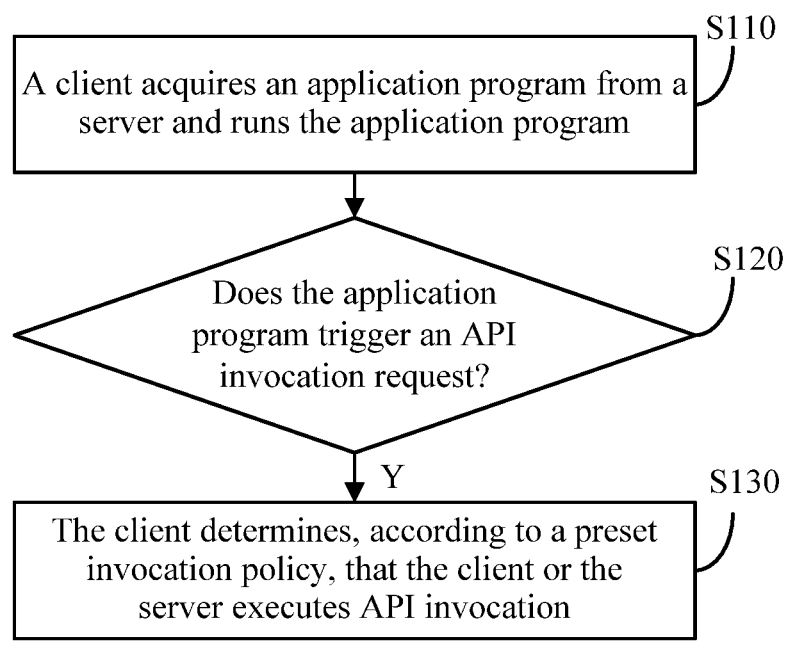
FIG. 1 shows a flowchart of a method for remotely running an application program according to an embodiment of the present disclosure.

A variety of exemplary embodiments, features, and aspects of the present disclosure are described in detail in the following with reference to accompanying drawings. Same reference numerals in the accompanying drawings denote elements with same or similar functions. Although illustrated in the accompanying drawings, various aspects of the embodiments may not be drawn to scale, unless otherwise specified.

The word "exemplary" used herein indicates "used as an example or embodiment, or illustrative". Any embodiment that is described as an exemplary embodiment should not be construed to be preferred over or better than another embodiment.

In addition, numerous details are set forth in the following embodiments to better describe the present disclosure. However, a person skilled in the art should understand that the present disclosure may be practiced without these details. In some other instances, well-known methods, means, elements, and circuits are not described in detail so as to highlight the subject matter of the present disclosure.

As described in the Background, to resolve the problem of remotely running an application program, the present disclosure brings forward the following innovative proposal: By means of decoupling API invocation, a client determines, according to an API invocation request and a preset invocation policy, that the client or a server executes the API invocation.

The method for remotely running an application program in the present disclosure can be used in the following scenario: at least two computers that are connected using a network. For example, a user accesses, using a device such as a mobile phone, a personal digital assistant (PDA), and a tablet computer, an application program that supports remote running and is on a server in an office network. A computer that the user directly operates is referred to as a client, and a computer that the user remotely accesses is referred to as a server. The client may include but is not limited to the following: a personal computer (PC) and a thin client. The client includes components such as a central processing unit (CPU), a video card, a system memory, a hard disk drive controller, a compact disc read-only memory (CD-ROM) drive controller, a serial port, and a network adapter. The components are connected by a system bus. A hard disk may be mounted to the hard disk drive controller, and an operating system, an application program and other data are generally provided with on the hard disk. A CD-ROM drive may be mounted to the CD-ROM drive controller, and an optical disc may be inserted into the CD-ROM drive. A mouse and a keyboard may be connected to the serial port. The video card may be connected to a display. The client and the server may further be connected to another computer using the network adapter. The server may include but is not limited to the following: a physical machine, various medium- and large-sized servers, a virtual machine and cloud storage in a cloud environment, and the like.

Embodiment 1

FIG. 1 shows a flowchart of a method for remotely running an application program according to an embodiment of the present disclosure. As shown in FIG. 1, the method for remotely running an application program mainly includes the following steps.

Step S110: A client acquires an application program from a server, and runs the application program on the client.

More specifically, when a user needs to remotely run an application program from the client, the client copies an execution part of the application program from the server to the client using a network, and runs the execution part of the application program on the client. In this process, the application program still invokes various interfaces on an operating system level on the server. For example, if the user needs to access an application program Microsoft Office Word on a server in an office network from a PDA, the user may copy a "Word.exe" file from the server to the client and execute the "Word.exe" file on the client to run the application program Word. This process is user-unperceivable and is transparent to the user.

Step S120: The client detects whether the application program triggers an API invocation request.

More specifically, when running the execution part of the application program, the client may detect whether the application program has an API invocation request. For example, the client attempts to intercept, using a HOOK technology, access of the application program to a system API. If the client intercepts the access of the application program to the system API, it is detected that the application program has an API invocation request.

Step S130: If the application program triggers the API invocation request, the client determines, according to a preset invocation policy, that the client or the server executes API invocation.

More specifically, the invocation policy may be preset according to an API invocation type, and device resource configurations of the client and the server. For example, the invocation policy may include: if the API invocation is to request to write data into a registry of the server, or request to save, onto the server, data obtained after running of the application program is ended, or request to access a network using a network resource of the server, determining that the API invocation does not need to be executed using a device resource of the client. The invocation policy may include the following policies.

Policy 1: If the API invocation indicates an access request for a device resource, for example, an access request for a memory, a video card, a processor, a mouse, a keyboard, or the like, the client may directly invoke a local system interface of the client to implement the API invocation because this type of API invocation needs to occupy a large quantity of computing resources, and resources such as the memory store only intermediate data in an execution process of the application program, and do not need to continuously save the data onto the server or continuously access a network resource of the server. For example, if the API invocation is a type of API invocation such as requesting video rendering, requesting graphics processing unit (GPU) acceleration, and requesting three dimensional (3D) acceleration, the client may directly use a local processor, video card, memory, and the like of the client to complete the API invocation. This manner can improve user experience because accessing the local memory is faster for the client. In addition, continuous access, such as read and write operations, to data or a network resource of the server on which the application program is located is not required, which can reduce an amount of data transmitted between the client and the server over a network and incur a lower security risk. To accelerate application program running on the client, the client may use a computer configuration with higher performance, thereby further improving the user experience.

Policy 2: If the API invocation indicates an access request that requires continuous access to data on the server on which the application program is located or requires continuous access to a network resource of the server, the API invocation is redirected to the server because the access request cannot be executed on the client and should be executed only on the server. That is, a resource of the server on which the application program is located is invoked to execute the API invocation. For example, if the API invocation is a type of API invocation such as requesting to write data into a registry of the server, or requesting to save, onto the server, data or a file obtained after running of the application program is completed on the client, or requesting to access the Internet using a network adapter of the server, the API invocation request may be sent to the server. Because data or a file that requires persistent access and secure storage can be stored on the server, such as cloud, instead of being stored on the client, information security is ensured for data storage. In addition, when the client does not have a network access capability, the application program can still access an external network using the network resource of the server.

According to different types of API invocation on a client for an application program, different invocation policies are used and a resource of the client or a server is selected to complete the API invocation. In this way, a device resource of the client can be used to execute a part of the API invocation, which enhances efficiency in remote running of the application program and improves user experience. In addition, latest data obtained according to a result of application program running can be saved onto the server, which ensures data access security. Therefore, remote running of the application program achieves effects the same as those achieved when the application program is run locally on the server.

Embodiment 2

Figure 2A:
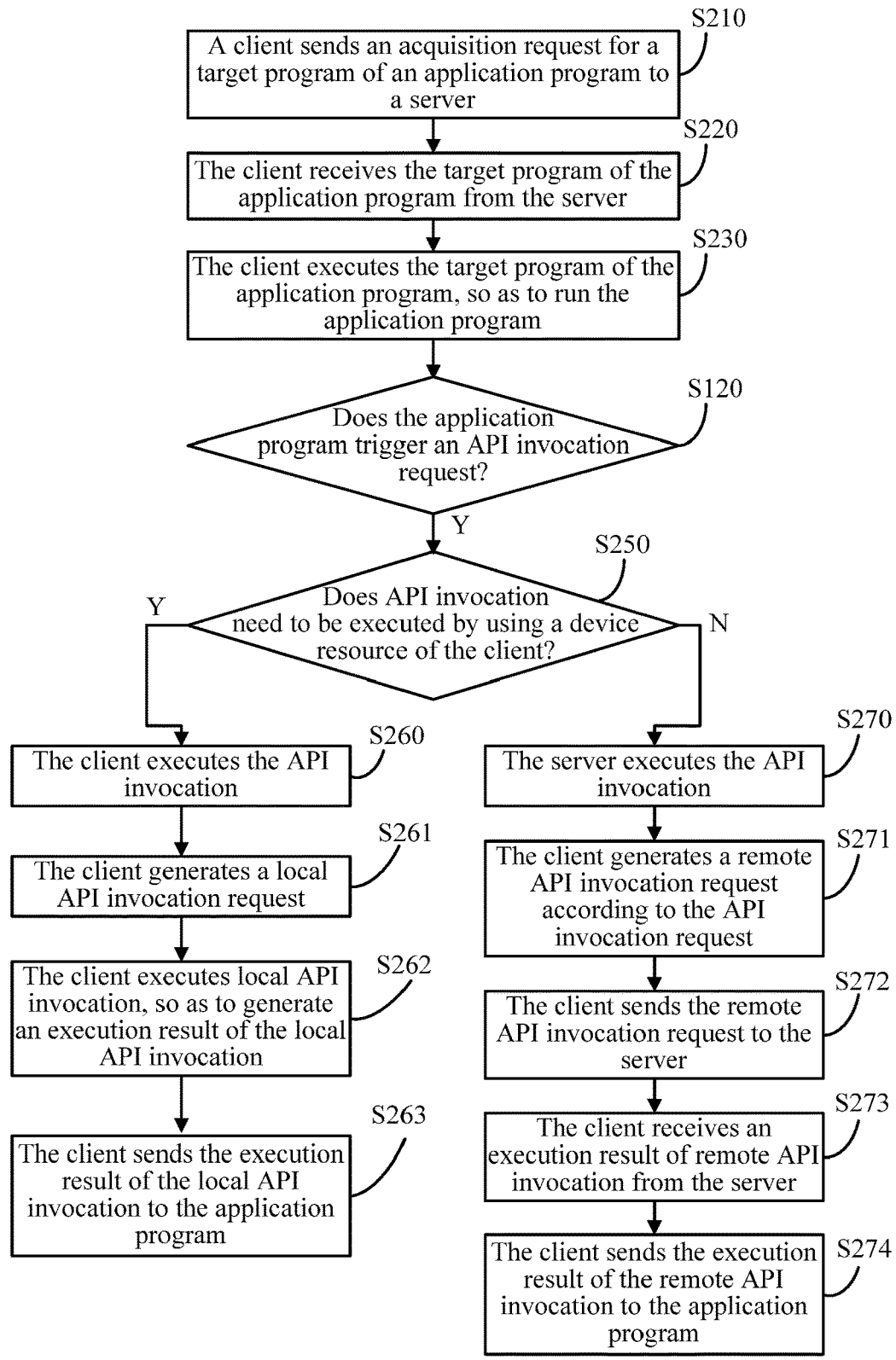
FIG. 2A, 2B, and FIG. 2C show flowcharts of a method for remotely running an application program according to another embodiment of the present disclosure.
Figure 2B:
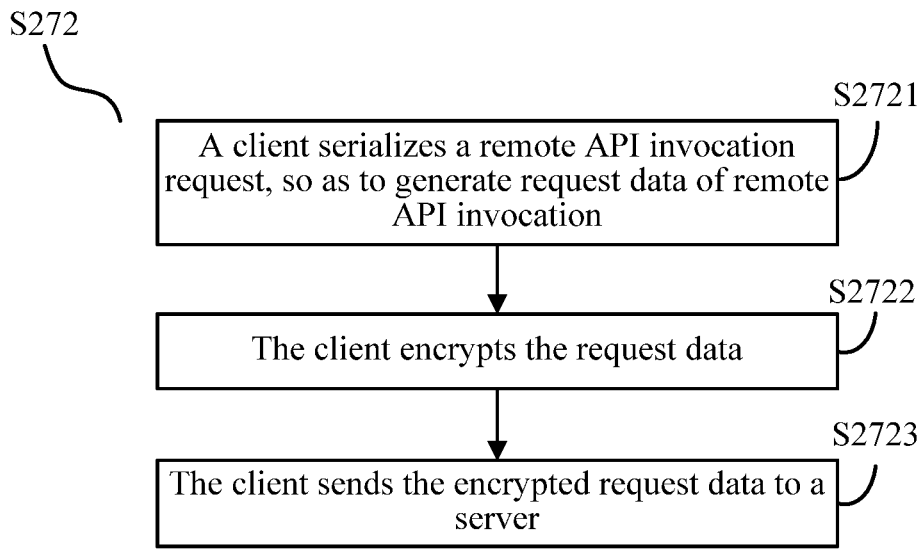
Figure 2C:
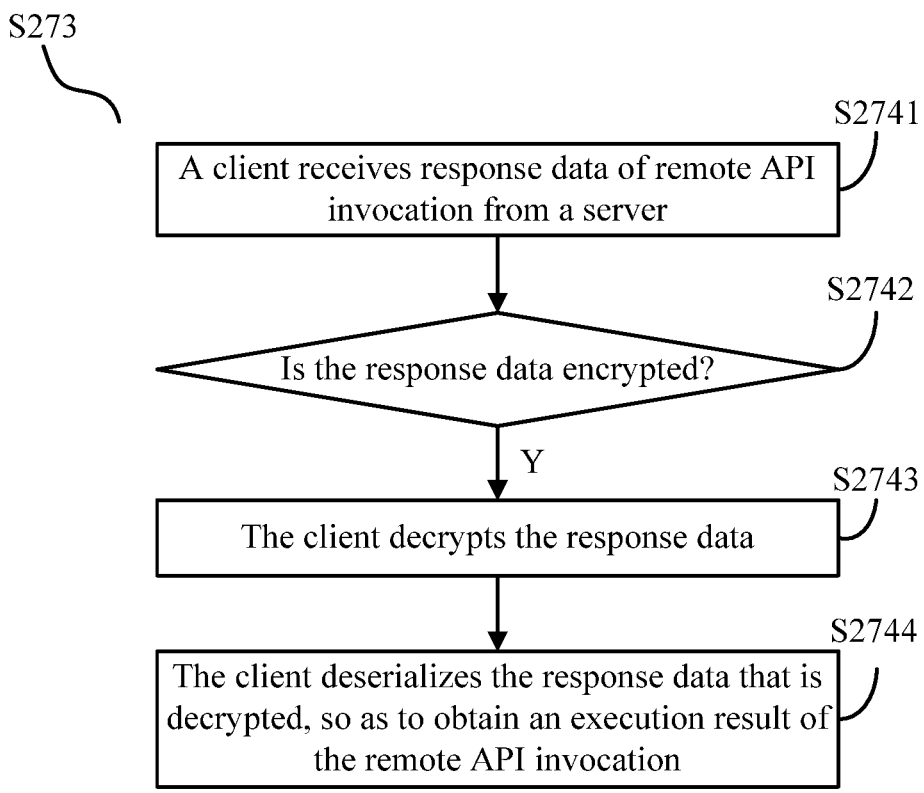

FIG. 2A to FIG. 2C show flowcharts of a method for remotely running an application program according to another embodiment of the present disclosure. Components in FIG. 2A to FIG. 2C that have reference numerals the same as those in FIG. 1 provide the same functions. For brevity, detailed descriptions of these components are omitted.

As shown in FIG. 2A, the method shown in FIG. 2A differs from the method shown in FIG. 1 mainly in that a client can receive a target program of an application program from a server and execute the target program, so as to run the application program on the client.

In detail, step S110 may include the following steps.

Step S210: The client sends an acquisition request for the target program of the application program to the server.

Step S220: The client receives the target program from the server.

Step S230: The client executes the target program, so as to run the application program on the client.

As shown in FIG. 2A, if a user needs to remotely run, on the client, an application program installed on the server, the user may perform an operation on the client, so as to determine the application program to be remotely run, send an acquisition request for a target program of the application program to the server, acquire the target program from the server, and execute the target program, such that the application program can be run on the client.

For example, the client may send a query request to the server. The query request is used to instruct the server to return a generated query result to the client. The query result may include a list of all application programs that are installed on the server and support remote running. For example, the list may include a document application program, a registry application program, and a network application program. After receiving the query result, the client may use a remote application program display module to display the query result on the client. For example, all the application programs that are received from the server and support remote running may be displayed on the client in a list manner. The user may select an application program to be run, for example, a document application program Word, from the application program list displayed on the client.

The client may send an acquisition request for a target program of the application program to the server according to a selection result of the user. The acquisition request may include a data transmission manner automatically specified by the client according to a current network environment. For example, the client may request the server to copy an execution part of an application program stored on the server, for example, a Word.exe file, to the client in a manner such as sharing and copying or Transmission Control Protocol (TCP)/IP. The client may use a sandbox execution environment of the client and invoke a system interface of the client to run the execution part of the application program, for example, running the document application program Word by executing the Word.exe file. The execution part of the application program includes only the target program of the application program, and does not include other data, such as various resources and runtime libraries, that is required for running the application program. The sandbox execution environment indicates that the application program is run on the client in a sandbox manner, and the client transfers system control rights to the sandbox execution environment when API invocation needs to be executed for the application program.

In this way, a client can remotely run an application program without having a storage device of a server such as a hard disk mounted to the client, thereby strengthening information security for remote running of the application program. In addition, only an execution part of the application program is copied, and therefore the application program occupies less resource space on the client, which helps the client access, at any time, another application program that needs to be run remotely.

In a possible implementation manner, in step S120, a manner in which the client detects whether the application program triggers the API invocation request may include but is not limited to any one of a HOOK manner, a filter driver manner, and a manner of replacing an interrupt table of a system.

More specifically, as shown in FIG. 2A, the client may use a HOOK technology to intercept access of the application program to a system API, so as to determine whether the application program has an API invocation request.

For example, the client may first inject a dynamic link library (DLL) to the target program of the application program before the target program is run, such that the DLL for initialization of the sandbox execution environment is loaded into process space of a target process. The client then executes an API HOOK procedure in the DLL, where the procedure enables all API invocation of the application program to point to corresponding API implementations in the sandbox execution environment. When the API invocation needs to be executed for the application program, the system control rights are transferred to the sandbox execution environment. If the client intercepts an access request of the application program for the system API, the client determines that the application program has the API invocation request. In addition, the client may use a manner such as a filter driver manner or a manner of replacing an interrupt table of a system to detect whether there is an API invocation request during application program running.

In this way, the client can obtain invocation of the system API by an application program each time, so as to determine that the client or the server executes the API invocation.

In a possible implementation manner, step S130 may include the following steps.

Step S250: The client determines whether the API invocation needs to be executed using a device resource of the client.

Step S260: If the API invocation needs to be executed using the device resource of the client, determine that the client executes the API invocation.

Step S270: If the API invocation does not need to be executed using the device resource of the client, determine that the server executes the API invocation.

More specifically, as shown in FIG. 2A, it is first determined whether the API invocation needs to be executed using the device resource of the client. It is determined that the server executes the API invocation only when the API invocation does not need to be executed using the device resource of the client.

For example, after API invocation is intercepted one time in the sandbox execution environment of the client, an API invocation decision module of the client first determines, according to a preset invocation policy, whether the API invocation of this time needs to be redirected to the server on which the application program is located for execution. API invocation for access to a resource such as a memory, a video card, and a CPU is executed by the client. API invocation that requires persistent resource access, such as file creation and file access, is executed by the server.

In this way, API invocation that requires persistent resource access can be redirected to a system of a remote server for execution, such that an execution result of an application program can be saved onto the remote server, thereby ensuring security and reliability of remote running of the application program. In addition, API invocation that involves a complex processing process or a large amount of data is executed by a client, which can fully use a device resource of the client and improve user experience.

In a possible implementation manner, the following steps may be included after step S260 is performed.

Step S261: The client generates a local API invocation request according to the API invocation request.

Step S262: The client invokes the device resource of the client and executes local API invocation according to the local API invocation request, so as to generate an execution result of the local API invocation.

Step S263: The client sends the execution result of the local API invocation to the application program.

More specifically, as shown in FIG. 2A, if the API invocation indicates an access request for a device such as a memory, a video card, a processor, a mouse, or a keyboard, the client may use the client resource to execute the API invocation.

For example, the user accesses an application program Word on a server in an office network from a PDA. In a process of running the application program Word by the user in a sandbox execution environment of a client, if the sandbox execution environment detects that API invocation of the application program Word is for file editing, such as text input and graphics drawing, because the API invocation does not require data reading or writing on the server, the client generates a local API invocation request according to an API invocation request, directly invokes a local interface of the client in the sandbox execution environment, performs an edit operation using a device resource of the client, such as a mouse and a keyboard, and returns an execution result of the API invocation, such as edited text and a drawn graph, to the application program Word, to complete the current API invocation. Finally, file editing is completed on the client by repeating the foregoing process.

In this way, when a hardware resource with higher performance, such as a memory, a video card, or a CPU, is configured on the client, the client can make full use of the hardware resource to execute the API invocation, thereby enhancing efficiency in remote running of the application program and improving user experience.

In a possible implementation manner, the following steps may be included after step S270 is performed.

Step S271: The client generates a remote API invocation request according to the API invocation request.

Step S272: The client sends the remote API invocation request to the server, where the remote API invocation request is used to instruct the server to execute remote API invocation and return an execution result of the remote API invocation.

Step S273: The client receives the execution result of the remote API invocation from the server.

Step S274: The client sends the execution result of the remote API invocation to the application program.

More specifically, as shown in FIG. 2A, if the API invocation indicates a request that requires persistent data access, such as registry reading and writing, and file reading and writing (for example, opening a file, creating a file, or saving a file), or a request for network access or the like, the client may instruct the server to use a server resource to execute the API invocation.

For example, the user accesses the application program Word on the server in the office network from the PDA. In the process of running the application program Word by the user in the sandbox execution environment of the client, if the sandbox execution environment detects that an API invocation request of the application program Word is for file creation, because API invocation requires reading and writing of server data, such as a template or a file, the client sends the API invocation request to the server, and the server executes the API invocation and returns an execution result of the API invocation, for example, that a file is created, to an application program of the client, so as to complete a current API invocation process and finally complete the file creation on the server.

In this way, the client can save, onto the server, data on a resource that needs to be accessed continuously during remote running of the application program, thereby ensuring data access security.

In a possible implementation manner, step S272 may include the following steps.

Step S2721: The client serializes the remote API invocation request, so as to generate request data of the remote API invocation, where the request data carries information about a serialized remote API invocation request.

Step S2722: The client encrypts the request data.

Step S2723: The client sends the encrypted request data to the server.

More specifically, as shown in FIG. 2B, the client may first convert the API invocation request of the application program into the request data in a serialization manner, and then serialized request data is transmitted between the client and the server over a network based on a protocol. To ensure data transmission security, an encryption algorithm may further be used to encrypt the request data.

For example, for API invocation that requires persistent resource access, such as file reading and writing or registry reading and writing, the client may first use an API serialization module of the client to serialize an API invocation function, converting it into a protocol data stream that is convenient for network transmission. Serialized content includes content such as a name of the API invocation function, a function parameter, and an identifier (ID) of current invocation. Then the client uses a security agent module of the client to encrypt serialized request data. Finally, the client transmits encrypted request data to the server over the network, such that the server executes the API invocation and returns an execution result to the client.

In a possible implementation manner, step S273 may include the following steps.

Step S2741: The client receives response data of the remote API invocation from the server, where the response data carries information about a serialized execution result of the remote API invocation.

Step S2742: The client determines whether the response data is encrypted.

Step S2743: If the response data of the remote API invocation is encrypted, the client decrypts the response data.

Step S2744: The client deserializes the response data that is decrypted, so as to obtain the execution result of the remote API invocation.

More specifically, as shown in FIG. 2C, after receiving the response data returned by the server, the client first decrypts and deserializes the data, and then returns the data to the application program.

For example, after the client receives the response data of the API invocation transmitted by the server, if it is determined that the response data is encrypted, the client first uses the security agent module of the client to decrypt the response data; and then the client uses the serialization module of the client to parse the response data and obtain the execution result of the current API invocation from the server, so as to return the execution result to the application program.

In this way, an API invocation request and an execution result can be securely and transparently transmitted between a client and a server by directly using an existing network transmission protocol, and an application program on the client and the server does not need to be changed on code level for adapting to the protocol. An existing application program can smoothly support remote startup and running, thereby improving compatibility of the remote running of the application program. In addition, a data encryption manner ensures data transmission security.

Embodiment 3

Figure 3:
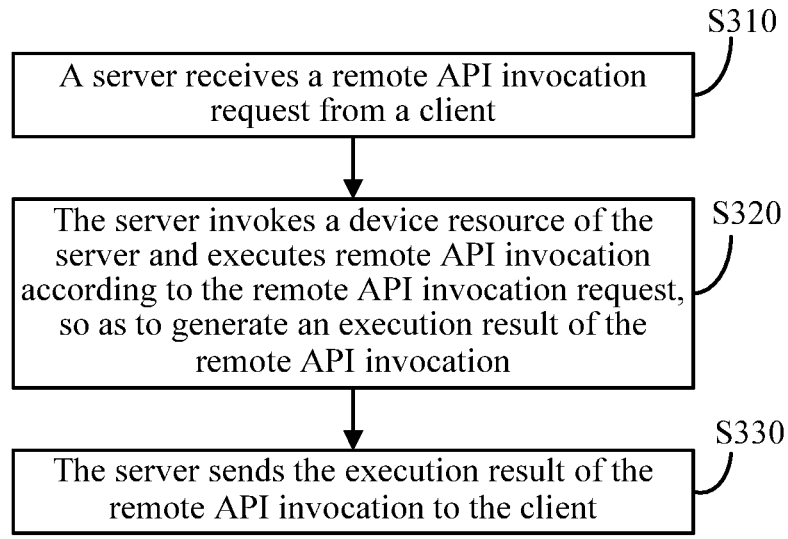
FIG. 3 shows a flowchart of a method for remotely running an application program according to still another embodiment of the present disclosure.

FIG. 3 shows a flowchart of a method for remotely running an application program according to still another embodiment of the present disclosure. As shown in FIG. 3, the method for remotely running an application program mainly includes the following steps.

Step S310: A server receives a remote API invocation request from a client, where the remote API invocation request carries information about requesting the server to execute API invocation.

Step S320: The server invokes a device resource of the server and executes remote API invocation according to the remote API invocation request, so as to generate an execution result of the remote API invocation.

Step S330: The server sends the execution result of the remote API invocation to the client.

More specifically, the server can use the device resource of the server to execute the remote API invocation, such as file reading and writing, registry reading and writing, or network access, and send the execution result to the client.

For example, if the remote API invocation request that is from the client and received by the server is for file creation, local API invocation generated by a server sandbox module of the server according to the remote API invocation request is for file creation, where the remote API invocation request includes an API name, a parameter of an invocation function, a protocol ID for invocation, and the like. Then, the server sandbox module uses a system interface and a device resource of the server, and invokes the system API to create a file. Finally, the file is created on the server, and an execution result of the local API invocation, that is, that the file is created, is sent to the client, such that the client completes the API invocation of an application program.

In this way, a data resource, such as a registry or a file, can be continuously and securely saved onto a system of a server on which an application program is located. Because data is stored on a device on which the application program is located or another secure device such as cloud instead of being stored on a client, a user does not need to worry about a data security problem, thereby ensuring security and reliability of data storage.

Embodiment 4

Figure 4A:
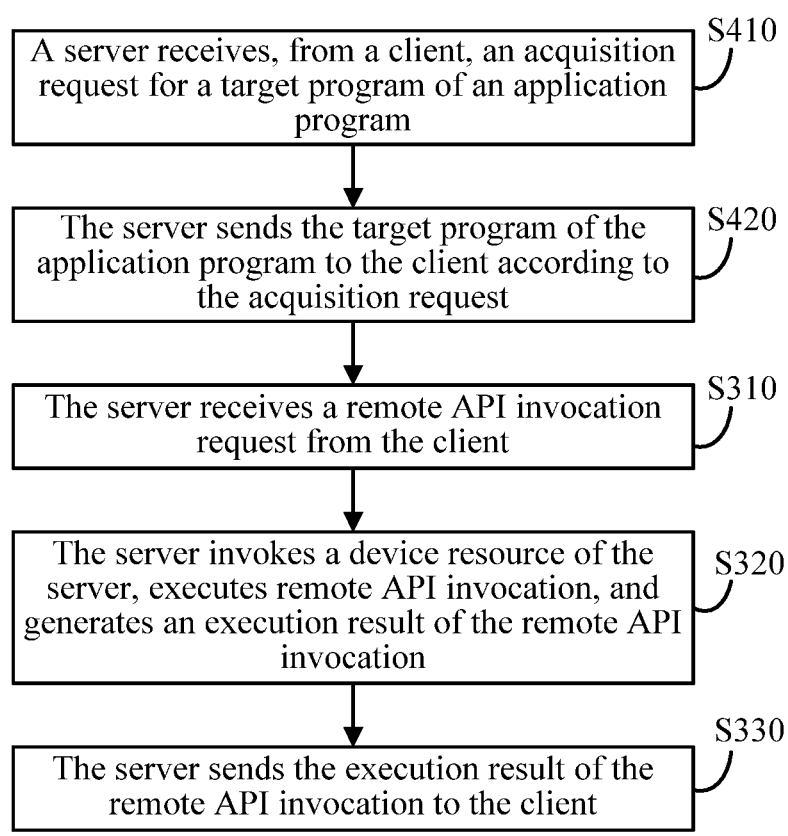
FIG. 4A, 4B, and FIG. 4C show flowcharts of a method for remotely running an application program according to yet another embodiment of the present disclosure.
Figure 4B:
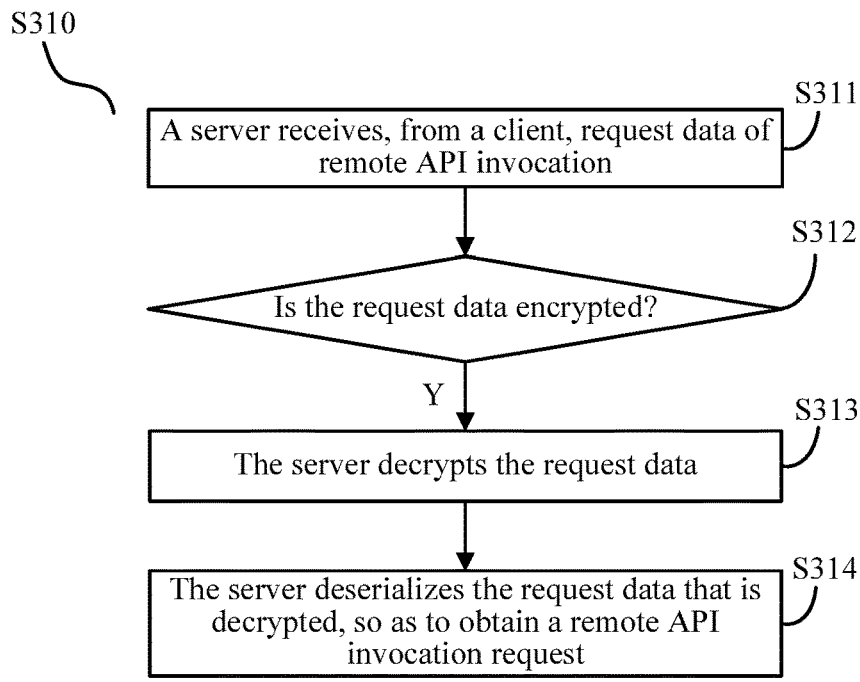
Figure 4C:
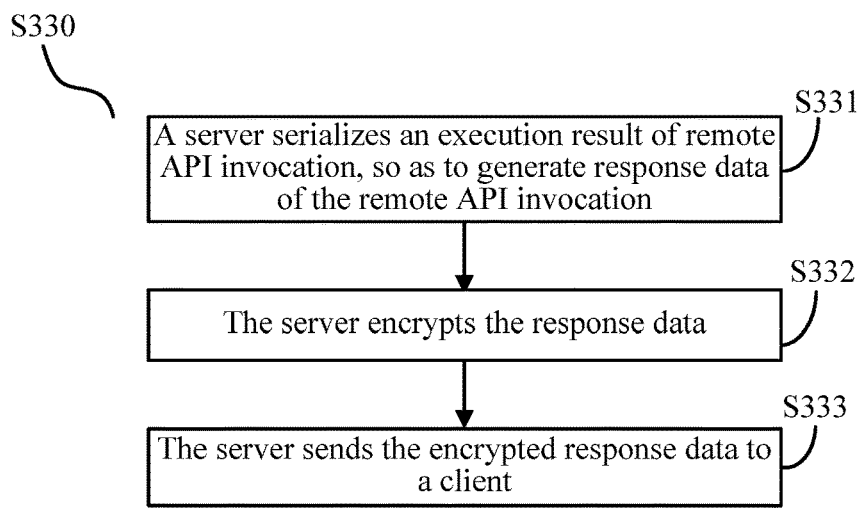

FIG. 4A to FIG. 4C show flowcharts of a method for remotely running an application program according to yet another embodiment of the present disclosure. Components in FIG. 4A to FIG. 4C that have reference numerals the same as those in FIG. 3 provide the same functions. For brevity, detailed descriptions of these components are omitted.

As shown in FIG. 4A, the method shown in FIG. 4A differs from the method shown in FIG. 3 mainly in that, according to a received acquisition request for a target program of an application program, a server sends the target program of the application program to a client.

In detail, the following steps may be included before step S310 is performed.

Step S410: The server receives, from the client, an acquisition request for a target program of an application program, where the acquisition request carries information about requesting the server to return the target program of the application program.

Step S420: The server sends the target program of the application program to the client according to the acquisition request.

More specifically, as shown in FIG. 4A, if the server receives, from the client, the acquisition request for the target program of the application program, the server sends the target program of the application program to the client according to the acquisition request.

For example, the server may generate a query result and return the query result to the client according to a query request of the client. The query result may include a list of all application programs that are installed on the server and support remote running. For example, the list may include a document application program, a registry application program, and a network application program. The list of application programs may be generated according to an application program selection policy preset on the server. For example, the selection policy may be a policy according to a use frequency of an application program or usage of an application program, another customized policy, and the like. A selection condition is preset, and only an application program that meets the selection condition can be included in the list.

If the server receives, from the client, the acquisition request for the target program of the application program, the server may transmit the target program of the application program to the client according to the acquisition request, where the acquisition request carries the information about requesting, by the client, the server to return the target program to the client. The acquisition request may further include a data transmission manner specified by the client. For example, the client requests the server to return an execution part of an application program stored on the server, for example, a Word.exe file, to the client in a manner such as sharing and copying or TCP/IP.

In a possible implementation manner, step S310 may include the following steps.

Step S311: The server receives, from the client, request data of the remote API invocation, where the request data carries information about a serialized remote API invocation request.

Step S312: The server determines whether the request data is encrypted.

Step S313: If the request data is encrypted, the server decrypts the request data.

Step S314: The server deserializes the request data that is decrypted, so as to obtain the remote API invocation request.

More specifically, as shown in FIG. 4B, after the server receives the request data, the server first decrypts and deserializes the request data and then executes the remote API invocation; an obtained execution result also needs to be serialized and encrypted before being sent to the client.

For example, the server receives the request data of the API invocation from the client, and if it is determined that the request data is encrypted, a security agent module of the server may first be used to decrypt the request data; a deserialization module of the server may deserialize the request data that is decrypted and perform parsing to obtain the remote API invocation request, where the remote API invocation request includes an API name, a parameter of an invocation function, a protocol ID for the invocation, and the like; then a server sandbox module of the server may convert the remote API invocation request into a local API invocation of the server, and use a system interface and a device resource of the server to execute the local API invocation of the server.

In a possible implementation manner, step S330 may include the following steps.

Step S331: The server serializes the execution result of the remote API invocation, so as to generate response data of the remote API invocation, where the response data carries information about a serialized execution result of the remote API invocation.

Step S332: The server encrypts the response data.

Step S333: The server sends the encrypted response data to the client.

More specifically, as shown in FIG. 4C, the server first serializes and encrypts an execution result of the local API invocation, and then sends to the client.

For example, after the server completes the local API invocation, first, a serialization module of the server is used to serialize the execution result of the local API invocation, which converts the execution result into a protocol data stream that is convenient for network transmission, and obtain the response data of the remote API invocation. Then, the security agent module of the server encrypts the response data. Finally, the server sends the encrypted response data to the client, such that the client completes the API invocation of an application program.

In this way, an API invocation request and an execution result can be securely and transparently transmitted between a client and a server by directly using an existing network transmission protocol without adapting, on a software code level, an application program on the client and the server to the protocol. An existing application program can smoothly support remote startup and running, thereby improving compatibility of the remote running of the application program. In addition, a data encryption manner ensures data transmission security.

Embodiment 5

Figure 5:
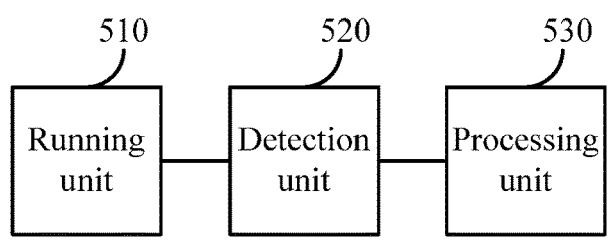
FIG. 5 shows a block diagram of an apparatus for remotely running an application program according to an embodiment of the present disclosure.

FIG. 5 shows a block diagram of an apparatus for remotely running an application program according to an embodiment of the present disclosure.

As shown in FIG. 5, the apparatus for remotely running an application program includes a running unit 510, a detection unit 520, and a processing unit 530. The running unit 510 is configured to acquire an application program from a server and run the application program on a client. The detection unit 520 is connected to the running unit 510 and configured to detect whether the application program triggers an API invocation request. The processing unit 530 is connected to the detection unit 520 and configured to, if the application program triggers the API invocation request, determine, according to a preset invocation policy, that the client or the server executes API invocation.

Figure 6:
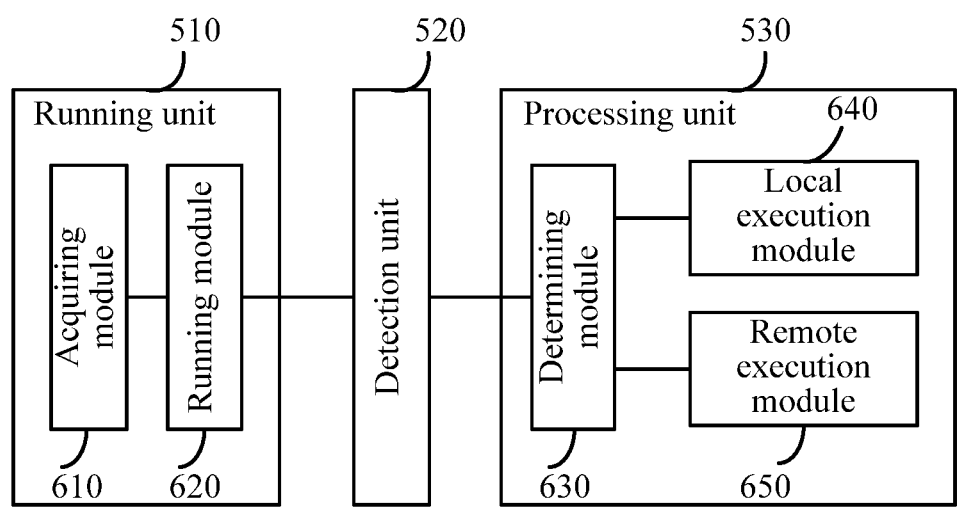
FIG. 6 shows a block diagram of an apparatus for remotely running an application program according to another embodiment of the present disclosure.

FIG. 6 shows a block diagram of an apparatus for remotely running an application program according to another embodiment of the present disclosure. Components in FIG. 6 that have reference numerals the same as those in FIG. 5 provide the same functions. For brevity, detailed descriptions of these components are omitted.

As shown in FIG. 6, the apparatus for remotely running an application program shown in FIG. 6 differs from the apparatus shown in FIG. 5 mainly in that the running unit 510 includes an acquiring module 610 and a running module 620. The acquiring module 610 is configured to send an acquisition request for a target program of the application program to the server, where the acquisition request is used to instruct the server to return the target program of the application program. The acquiring module 610 is further configured to receive the target program from the server. The running module 620 is connected to the acquiring module 610 and configured to execute the target program, so as to run the application program on the client.

In a possible implementation manner, the processing unit 530 includes a determining module 630, and the determining module 630 is connected to the detection unit 520 and is configured to determine whether the API invocation needs to be executed using a device resource of the client; and if the API invocation needs to be executed using the device resource of the client, determine that the client executes the API invocation; or if the API invocation does not need to be executed using the device resource of the client, determine that the server executes the API invocation.

In a possible implementation manner, the processing unit 530 further includes a local execution module 640, where the local execution module 640 is connected to the determining module 630 and after it is determined that the client executes the API invocation, is configured to generate a local API invocation request according to the API invocation request; invoke the device resource of the client and execute local API invocation according to the local API invocation request, so as to generate an execution result of the local API invocation; and send the execution result of the local API invocation to the application program.

In a possible implementation manner, the processing unit 530 further includes a remote execution module 650, where the remote execution module 650 is connected to the determining module 630 and after it is determined that the server executes the API invocation, is configured to generate a remote API invocation request according to the API invocation request; send the remote API invocation request to the server, where the remote API invocation request is used to instruct the server to execute remote API invocation and return an execution result of the remote API invocation; receive, from the server, the execution result of the remote API invocation; and send the execution result of the remote API invocation to the application program.

In a possible implementation manner, the remote execution module 650 is further configured to serialize the remote API invocation request, so as to generate request data of the remote API invocation, where the request data carries information about a serialized remote API invocation request; encrypt the request data; and send the encrypted request data to the server.

In a possible implementation manner, the remote execution module 650 is further configured to receive response data of the API invocation from the server, where the response data carries information about a serialized execution result of the remote API invocation; if the response data is encrypted, decrypt the response data; and deserialize the response data that is decrypted, so as to obtain the execution result of the remote API invocation.

In a possible implementation manner, a manner in which the detection unit 520 detects whether the application program triggers the API invocation request includes any one of a HOOK manner, a filter driver manner, and a manner of replacing an interrupt table of a system.

For a mechanism and beneficial effects of implementing remote running of an application program using the apparatus for remotely running an application program, reference may be made to FIG. 1 to FIG. 2C and related descriptions of the figures.

Embodiment 6

Figure 7:
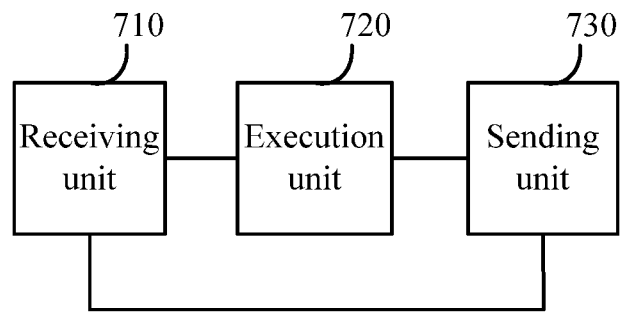
FIG. 7 shows a block diagram of an apparatus for remotely running an application program according to still another embodiment of the present disclosure.

FIG. 7 shows a block diagram of an apparatus for remotely running an application program according to still another embodiment of the present disclosure.

As shown in FIG. 7, the apparatus for remotely running an application program includes a receiving unit 710, an execution unit 720, and a sending unit 730. The receiving unit 710 is configured to receive a remote API invocation request from a client, where the remote API invocation request carries information about requesting, by the client, a server to execute API invocation. The execution unit 720 is connected to the receiving unit 710 and configured to invoke a device resource of the server and execute remote API invocation according to the remote API invocation request, so as to generate an execution result of the remote API invocation. The sending unit 730 is connected to the receiving unit 710 and the execution unit 720 and configured to send the execution result of the remote API invocation to the client.

In a possible implementation manner, the receiving unit 710 is further configured to receive, from the client, an acquisition request for a target program of an application program, where the acquisition request carries information about requesting the server to return the target program of the application program. The sending unit 730 is further configured to send the target program of the application program to the client according to the acquisition request.

In a possible implementation manner, the receiving unit 710 is further configured to receive, from the client, request data of the remote API invocation, where the request data carries information about a serialized remote API invocation request; if the request data is encrypted, decrypt the request data; and deserialize the request data that is decrypted, so as to obtain the remote API invocation request.

In a possible implementation manner, the sending unit 730 is further configured to serialize the execution result of the remote API invocation, so as to generate response data of the remote API invocation, where the response data carries information about a serialized execution result of the remote API invocation; encrypt the response data; and send the encrypted response data to the client.

For a mechanism and beneficial effects of implementing remote running of an application program using the apparatus for remotely running an application program, reference may be made to FIG. 3 to FIG. 4C and related descriptions of the figures.

Embodiment 7

Figure 8:
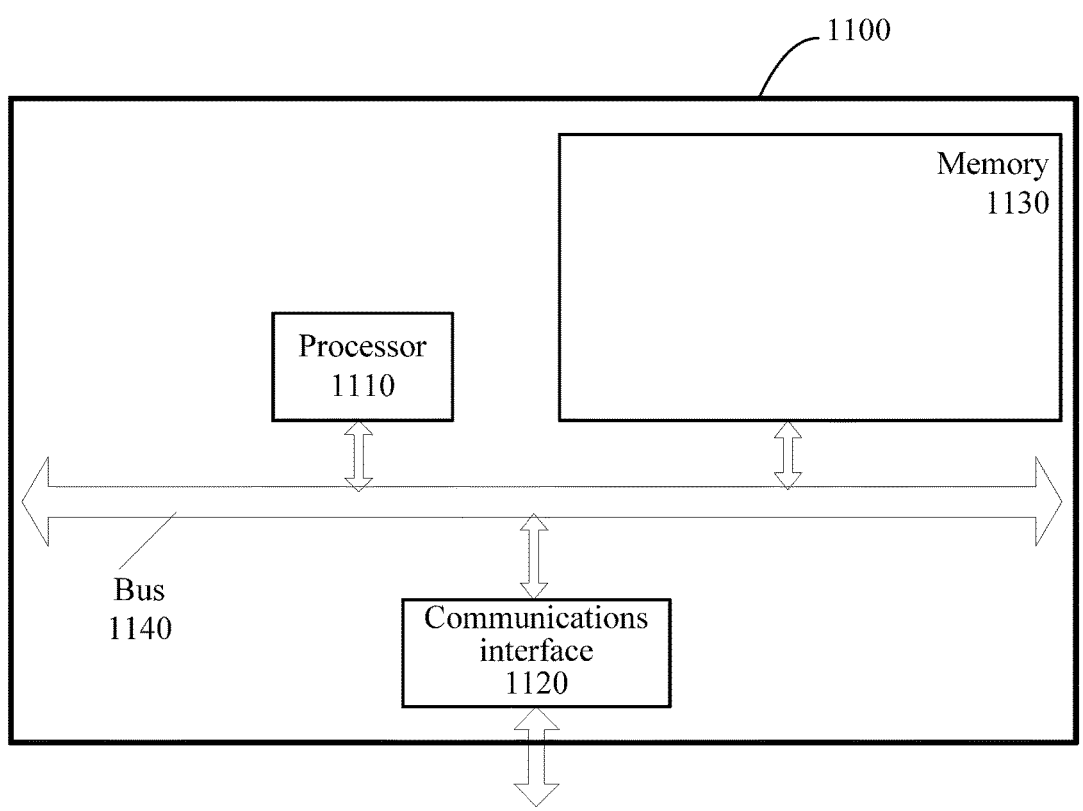
FIG. 8 shows a block diagram of an apparatus for remotely running an application program according to yet another embodiment of the present disclosure.

FIG. 8 shows a block diagram of an apparatus for remotely running an application program according to still another embodiment of the present disclosure. The apparatus 1100 for remotely running an application program may be a host server or PC that has a computing capability, a portable computer or terminal, or the like. The embodiment of the present disclosure does not impose a limitation on specific implementation of a computing node.

The apparatus 1100 for remotely running an application program includes a processor 1110, a communications interface 1120, a memory 1130, and a bus 1140. The processor 1110, the communications interface 1120, and the memory 1130 complete communication with each other using the bus 1140.

The communications interface 1120 is configured to communicate with a network device, where the network device includes, for example, a virtual machine management center and shared storage.

The processor 1110 is configured to execute an application program. The processor 1110 may be a CPU or an application-specific integrated circuit (ASIC), or is set as one or more integrated circuits for implementing the embodiment of the present disclosure.

The memory 1130 is configured to store a file. The memory 1130 may include a high-speed random access memory (RAM) memory, and may further include a non-volatile memory, such as at least one disk memory. Alternatively, the memory 1130 may be a memory array. The memory 1130 may also be partitioned, and partitions can form a virtual volume according to a rule.

In a possible implementation manner, the application program may be application program code that includes a computer operation instruction. The application program may be configured to enable a client to acquire an application program from a server and run the application program on the client; detect whether the application program triggers an API invocation request; and if the application program triggers the API invocation request, determine, by the client according to a preset invocation policy, that the client or the server executes API invocation.

In a possible implementation manner, the application program may be further configured to enable the client to send, to the server, an acquisition request for a target program of the application program, where the acquisition request is used to instruct the server to return the target program of the application program; receive the target program from the server; and execute the target program, so as to run the application program on the client.

In a possible implementation manner, the application may be further configured to enable the client to determine whether the API invocation needs to be executed using a device resource of the client; and if the API invocation needs to be executed using the device resource of the client, determine that the client executes the API invocation; or if the API invocation does not need to be executed using the device resource of the client, determine that the server executes the API invocation.

In a possible implementation manner, the invocation policy includes, if the API invocation is to request to write data into a registry of the server, or request to save, onto the server, data obtained after running of the application program is ended, or request to access a network using a network resource of the server, determining that the API invocation does not need to be executed using the device resource of the client.

In a possible implementation manner, the application program may be further configured to enable the client to, after determining that the client executes the API invocation, generate a local API invocation request according to the API invocation request; invoke the device resource of the client and execute local API invocation according to the local API invocation request, so as to generate an execution result of the local API invocation; and send the execution result of the local API invocation to the application program.

In a possible implementation manner, the application program may be further configured to enable the client to, after determining that the server executes the API invocation, generate a remote API invocation request according to the API invocation request; send the remote API invocation request to the server, where the remote API invocation request is used to instruct the server to execute remote API invocation and return an execution result of the remote API invocation; receive, from the server, the execution result of the remote API invocation; and send the execution result of the remote API invocation to the application program.

In a possible implementation manner, the application program may be further configured to enable the client to serialize the remote API invocation request, so as to generate request data of the remote API invocation, where the request data carries information about a serialized remote API invocation request; encrypt the request data; and send the encrypted request data to the server.

In a possible implementation manner, the application program may be further configured to enable the client to receive, from the server, response data of the API invocation, where the response data carries information about a serialized execution result of the remote API invocation; if the response data is encrypted, decrypt the response data; and deserialize the response data that is decrypted, so as to obtain the execution result of the remote API invocation.

In a possible implementation manner, a manner of detecting whether the application program triggers the API invocation request includes any one of a HOOK manner, a filter driver manner, and a manner of replacing an interrupt table of a system.

For a mechanism and beneficial effects of implementing remote running of an application program using the apparatus for remotely running an application program, reference may be made to FIG. 1 to FIG. 2C and related descriptions of the figures.

Embodiment 8

Figure 9:
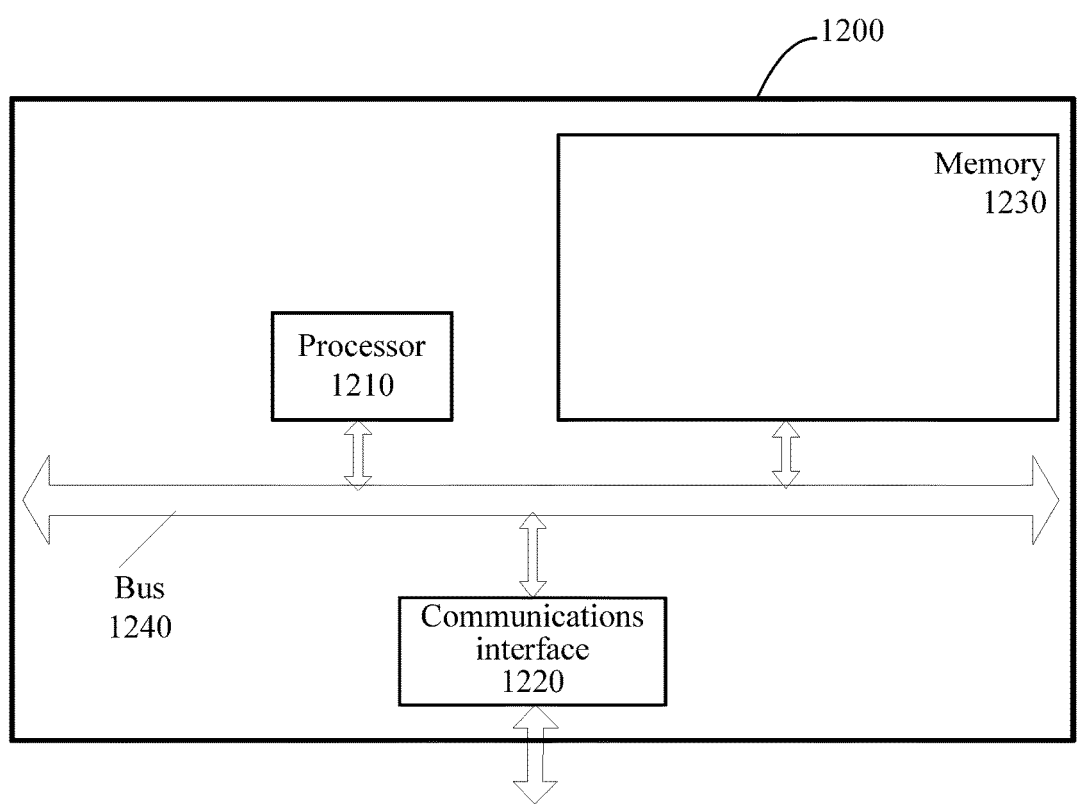
FIG. 9 shows a block diagram of an apparatus for remotely running an application program according to still yet another embodiment of the present disclosure.

FIG. 9 shows a block diagram of an apparatus for remotely running an application program according to still another embodiment of the present disclosure. The apparatus 1200 for remotely running an application program may be a host server or PC that has a computing capability, a portable computer or terminal, or the like. The embodiment of the present disclosure does not impose a limitation on specific implementation of a computing node.

The apparatus 1200 for remotely running an application program includes a processor 1210, a communications interface 1220, a memory 1230, and a bus 1240. The processor 1210, the communications interface 1220, and the memory 1230 complete communication with each other using the bus 1240.

The communications interface 1220 is configured to communicate with a network device, where the network device includes, for example, a virtual machine management center and shared storage.

The processor 1210 is configured to execute an application program. The processor 1210 may be a CPU or an ASIC, or is set as one or more integrated circuits for implementing the embodiment of the present disclosure.

The memory 1230 is configured to store a file. The memory 1230 may include a high-speed RAM memory, and may further include a non-volatile memory, such as at least one disk memory. Alternatively, the memory 1230 may be a memory array. The memory 1230 may also be partitioned, and partitions can form a virtual volume according to a rule.

In a possible implementation manner, the application program may be application program code that includes a computer operation instruction. The application program may be configured to enable a server to receive a remote API invocation request from a client, where the remote API invocation request carries information about requesting, by the client, the server to execute API invocation; invoke a device resource of the server and execute remote API invocation according to the remote API invocation request, so as to generate an execution result of the remote API invocation; and send the execution result of the remote API invocation to the client.

In a possible implementation manner, the application program may be further configured to enable the server to, before the server receives the remote API invocation request from the client, receive an acquisition request for a target program of an application program from the client, where the acquisition request carries information about requesting the server to return the target program of the application program; and send the target program of the application program to the client according to the acquisition request.

In a possible implementation manner, the application program may be further configured to enable the server to receive request data of the remote API invocation from the client, where the request data carries information about a serialized remote API invocation request; if the request data is encrypted, decrypt the request data; and deserialize the request data that is decrypted, so as to obtain the remote API invocation request.

In a possible implementation manner, the application program may be further configured to enable the server to serialize the execution result of the remote API invocation, so as to generate response data of the remote API invocation, where the response data carries information about a serialized execution result of the remote API invocation; encrypt the response data; and send the encrypted response data to the client.

For a mechanism and beneficial effects of implementing remote running of an application program using the apparatus for remotely running an application program, reference may be made to FIG. 3 to FIG. 4C and related descriptions of the figures.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present disclosure.

If the functions are implemented in a form of computer software and sold or used as an independent product, it can be deemed to some extent that all or some of the technical solutions of the present disclosure (for example, the part contributing to the prior art) are implemented in a form of a computer software product. The computer software product is generally stored in a computer-readable storage medium and includes several instructions for instructing a computer device (which may be a PC, a server, or a network device) to perform all or some of the steps of the methods described in the embodiments of the present disclosure. The foregoing storage medium includes any medium that can store application program code, such as a universal serial bus (USB) flash drive, a removable hard disk, a read-only memory (ROM), a RAM, a magnetic disk, or an optical disc.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for remotely running an application program, comprising:

acquiring, by a client, an application program from a server and running the application program on the client;

detecting, by the client, whether the application program triggers an application programming interface (API) invocation request intended for a system API on the server;

intercepting, by the client, the API invocation request intended for the system API;

determining, by the client according to a preset invocation policy, that the client or the server executes API invocation when the application program triggers the API invocation request;

generating, by the client, a local API invocation request according to the API invocation request when determining that the client executes the API invocation;

invoking, by the client, a device resource of the client and executing local API invocation according to the local API invocation request, so as to generate an execution result of the local API invocation;

sending, by the client, the execution result of the local API invocation to the application program;

generating, by the client, a remote API invocation request according to the API invocation request when determining that the server executes the API invocation;

sending, by the client, the remote API invocation request to the server, the remote API invocation request being used to instruct the server to execute remote API invocation and return an execution result of the remote API invocation;

receiving, by the client from the server, the execution result of the remote API invocation; and sending, by the client, the execution result of the remote API invocation to the application program.

2. The method according to claim 1, wherein acquiring, by the client, the application program from the server and running the application program on the client comprises:

sending, by the client to the server, an acquisition request for a target program of the application program, the acquisition request being used to instruct the server to return the target program of the application program;

receiving, by the client, the target program from the server; and executing, by the client, the target program, so as to run the application program on the client.

3. The method according to claim 1, wherein determining, by the client according to the preset invocation policy, that the client or the server executes API invocation comprises:

determining, by the client, whether the API invocation needs to be executed using the device resource of the client;

determining that the client executes the API invocation when the API invocation needs to be executed using the device resource of the client; and determining that the server executes the API invocation when the API invocation does not need to be executed using the device resource of the client.

4. The method according to claim 3, wherein the preset invocation policy comprises determining that the API invocation does not need to be executed using the device resource of the client when the API invocation is to request to write data into a registry of the server, request to save, onto the server, data obtained after running of the application program is ended, or request to access a network using a network resource of the server.

5. The method according to claim 1, wherein sending, by the client, the remote API invocation request to the server comprises:
   serializing, by the client, the remote API invocation request so as to generate request data of the remote API invocation, the request data carrying information about a serialized remote API invocation request;
   encrypting, by the client, the request data; and
   sending, by the client, the encrypted request data to the server.

6. The method according to claim 1, wherein receiving, by the client from the server, the execution result of the remote API invocation comprises:
   receiving, by the client from the server, response data of the API invocation, the response data carrying information about a serialized execution result of the remote API invocation;
   decrypting, by the client, the response data, when the response data is encrypted; and
   deserializing, by the client, the response data that is decrypted, so as to obtain the execution result of the remote API invocation.

7. An apparatus for remotely running an application program, comprising:
   a processor configured to:
   acquire an application program from a server and run the application program on a client;
   detect whether the application program triggers an application programming interface (API) invocation request intended for a system API on the server;
   intercept the API invocation request intended for the system API;
   determine, according to a preset invocation policy, that the client or the server executes API invocation when the application program triggers the API invocation request;
   generate a local API invocation request according to the API invocation request when it is determined that the client executes the API invocation;
   invoke a device resource of the client and execute local API invocation according to the local API invocation request, so as to generate an execution result of the local API invocation;
   send the execution result of the local API invocation to the application program;
   generate a remote API invocation request according to the API invocation request when it is determined that the server executes the API invocation;
   send the remote API invocation request to the server, the remote API invocation request being used to instruct the server to execute remote API invocation and return an execution result of the remote API invocation;
   receive, from the server, the execution result of the remote API invocation; and
   send the execution result of the remote API invocation to the application program.

8. The apparatus according to claim 7, wherein the processor is further configured to:
   send an acquisition request for a target program of the application program to the server, the acquisition request being used to instruct the server to return the target program of the application program;
   receive the target program from the server; and
   execute the target program, so as to run the application program on the client.

9. The apparatus according to claim 7, wherein the processor is further configured to:
   determine whether the API invocation needs to be executed using the device resource of the client;
   determine that the client executes the API invocation when the API invocation needs to be executed using the device resource of the client; and
   determine that the server executes the API invocation when the API invocation does not need to be executed using the device resource of the client.

10. The apparatus according to claim 9, wherein the preset invocation policy comprises determining that the API invocation does not need to be executed using the device resource of the client, when the API invocation is to request to write data into a registry of the server, request to save, onto the server, data obtained after running of the application program is ended, or request to access a network using a network resource of the server.

11. The apparatus according to claim 7, wherein the processor is further configured to:
   serialize the remote API invocation request, so as to generate request data of the remote API invocation, the request data carrying information about a serialized remote API invocation request;
   encrypt the request data; and
   send the encrypted request data to the server.

12. The apparatus according to claim 7, wherein the processor is further configured to:
   receive response data of the API invocation from the server, the response data carrying information about a serialized execution result of the remote API invocation;
   decrypt the response data when the response data is encrypted; and
   deserialize the response data that is decrypted, so as to obtain the execution result of the remote API invocation.

* * * * *